(No Model.)

B. H. GOODSELL, C. ADAMSON & C. O. HERING.
ELECTRICALLY HEATED MIRROR.

No. 281,224. Patented July 10, 1883.

Witnesses
C. M. Steinmetz
Robt E. Downing

Inventor
Benjamin H. Goodsell
Charles Adamson
Carl O. Hering

UNITED STATES PATENT OFFICE.

BENJAMIN H. GOODSELL, CHARLES ADAMSON, AND CARL O. HERING, OF PHILADELPHIA, PENNSYLVANIA.

ELECTRICALLY-HEATED MIRROR.

SPECIFICATION forming part of Letters Patent No. 281,224, dated July 10, 1883.

Application filed December 14, 1882. (No model.)

*To all whom it may concern:*

Be it known that we, BENJAMIN H. GOODSELL, CHARLES ADAMSON, and CARL OTTO HERING, citizens of the United States, residing at Philadelphia, in the county of Philadelphia and State of Pennsylvania, have invented an Improved Electrically-Heated Mirror, which will not cloud with moisture or have its reflecting powers diminished by reason of the moisture deposited on its surface from the breath; and we do hereby declare that the following is a full, clear, and exact description of the invention, which will enable others skilled in the business to which it appertains to make and use the same.

Our invention relates to all those kinds of mirrors used by dentists or medical men in examining the interior of the mouth or throat. The ordinary mirror that is used becomes dimmed as soon as the breath strikes it, owing to the immediate condensation of moisture of the breath upon the surface of the mirror.

The object of our invention is to make a mirror that will not cloud or be tarnished by moisture deposited as aforesaid. This end we accomplish by raising the temperature of the glass and maintaining such a temperature that the moisture from the breath is evaporated as soon as deposited, leaving the surface bright and untarnished, and preserving its power of giving a clear and sharp reflection. The necessary heat required to obtain this increased temperature in the glass is procured and applied to our purpose by passing an electric current through a resisting body placed very near the mirror. For the resisting medium, a platinum wire of very small diameter is used. The wire, being heated by the passage of the electrical current through it, communicates its heat to the adjacent glass.

An examination of the annexed drawings will explain more fully the mode of working the glass and the means of constructing the same.

Figure 1:
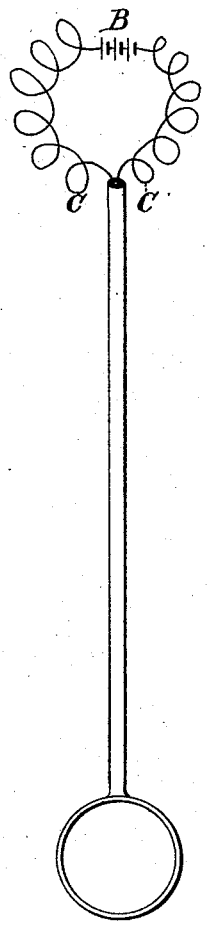
Figure 2:
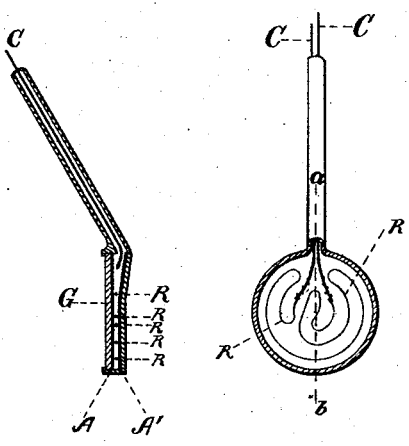
Figures 3, 4:
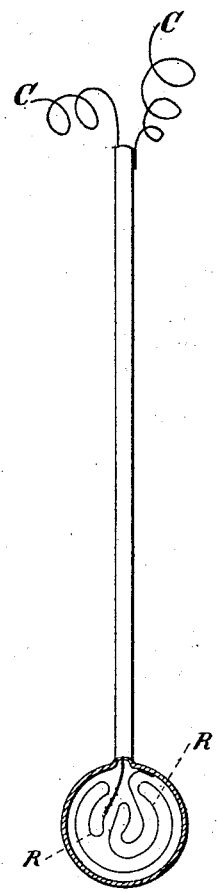

Figure 1 represents the front view of the glass. Fig. 3 shows the rear view of the glass, with the back of metal case removed. Fig. 2 is a section through the mirror at *a b* in Fig. 3. Fig. 4 shows the back view of the glass with the case removed, as in Fig. 3. In this figure but one conducting-wire is passed through the handle.

To explain more fully the manner of constructing and using the invention, I refer again to Fig. 1, which shows the front view of the glass and handle. The handle is a hollow tube, through which the wires C and C, which transmit the electricity to the resistance-wires, pass.

B represents the source from which the electricity is derived.

The mirror is the ordinary mirror now used by the makers of instruments in constructing glasses for examining the throat—in short, the ordinary kind of mirror.

In Fig. 3, C and C are the insulated conducting-wires, passing through the hollow handle. The ends of the wires are fastened to the ends of a highly-resisting wire of platinum, R R, which is coiled and securely fastened between the back of the mirror and the back of case. This wire, by the passage of the electrical current through it, becomes heated, due to the resistance it offers to the passage of said current. The heat so produced is communicated to the glass, and so prevents the moisture of the breath from being deposited and condensed on the surface of the glass, thereby clouding the glass and diminishing its reflecting powers.

Fig. 2 is a section through *a b* in Fig. 3. G, Fig. 2, is the glass, behind which is a disk of paper, A, or other non-conducting substance. On this disk A is coiled and securely fastened the resistance-wire R, the disk on which it is coiled serving two purposes—to protect the silvered part of the mirror from excessive heat, and prevent electrical contact with the mirror and the disk. Between the resistance-wires R R and the back of the case is placed a second disk of paper, A', or other non-conducting substance, which is to prevent electrical contact with the metal case and prevent loss of heat by radiation.

Fig. 4 shows a drawing of the mirror and handle when only one wire is passed through the handle connecting with one end of the resistance-wire R R, the other end being fastened with the metal case and connected by means of the handle with the conducting-wire C at the end of the handle.

What we claim is—

1. The combination, with a mirror, of an electrical resistance located between the glass and back of said mirror, with connections, substantially as set forth, whereby on the passage of an electrical current said resistance becomes heated, thereby preventing the formation of moisture on the glass, substantially as shown and described.

2. The combination, with mirror G and a back to the mirror, of insulating-disks A and A', resistance-wire R, located between said disks, and connections for said resistance, substantially as shown and described.

3. The combination, with mirror G, having an electrical resistance, R, insulating-disks A and A', and back to mirror, of a hollow handle, and conducting-wires for such resistance R passing through said handle, substantially as shown and described.

BENJAMIN H. GOODSELL.
CHARLES ADAMSON.
CARL O. HERING.

Witnesses:
C. M. STEINMETZ,
ROBT. E. DOWNING.